Patented July 3, 1951

2,559,323

UNITED STATES PATENT OFFICE 2,559,323

PROCESS FOR THE DESULFURIZATION OF HYDROCARBONS

Paul Xavier Spillane, Abbotsford, near Sydney, New South Wales, Australia, assignor to Keith Williams, Sydney, New South Wales, Australia No Drawing. Application October 11, 1948, Serial No. 53,988. In Australia March 4, 1944

7 Claims. (Cl. 196—28)

This invention relates to the desulphurisation of hydrocarbons.

For many years scientific workers have been endeavouring to evolve an efficient method of removing sulphur compounds from hydrocarbons and some measure of success has attended such endeavours. It has, however, been acknowledged that the methods which have been evolved have not been as satisfactory as is desirable, with the consequence that scientists are still seeking a satisfactory method.

The prior methods employing solid desulphurising agents were of two types, namely:

1. In which sulphur compounds were removed by direct chemical combination with the desulphurising agent. Such desulphurising agents commonly employed iron oxide, and were effective to a limited extent with hydrocarbons in either the liquid or gaseous phase, and 2. In which sulphur compounds were removed by a catalytic breaking down of the sulphur compounds followed by a chemical reaction with the desulphurising agent.

In all prior methods wherein the hydrocarbons have been treated in the vapor phase it has been necessary to remove any hydrogen sulphide before passing the hydrocarbons over the desulphurising agent, for example by an iron oxide treatment, since the desulphurising agents would not remove organic sulphur compounds from the hydrocarbons in the presence of hydrogen sulphide, apparently due to a selective preference of the agent for hydrogen sulphide. Furthermore, the prior methods would not remove thiophene from the hydrocarbons.

The present method is of the second type referred to above but, in contrast to prior methods, it will enable organic sulphur compounds to be removed from hydrocarbons in the presence of hydrogen sulphide. It will also enable thiophene to be removed.

Accordingly, it is an object of this invention to provide a method of desulphurising hydrocarbons which will enable organic sulphur compounds to be removed from the hydrocarbons, when in the vapor phase, in the presence of hydrogen sulphide. It is also an object to provide such a method which will enable thiophene to be removed from hydrocarbons when in the vapor phase. A further object is to provide a desulphurising agent for use in the method, and also to provide a method of preparing the desulphurising agent.

The process of desulphurising hydrocarbons according to this invention comprises passing the hydrocarbons in the vapor phase at temperatures between 80° C. and 400° C. into contact with a desulphurising agent comprising essentially at least one alkali carbonate and catalytically active metallic iron, the said agent being prepared from an intimate admixture of at least one alkali carbonate and an iron oxide in which the proportion of alkali carbonate lies between 5% and 40%, and the said admixture being reduced by a reducing agent selected from the class consisting of hydrogen, carbon monoxide, and mixtures of hydrogen and carbon monoxide at a temperature between approximately 210° C. and 250° C.

The term "catalytically active metallic iron" means iron metal in such a physical state as would be suitable for employment in a catalyst for the hydrogenation of carbon monoxide. The catalytically active metallic iron is prepared by reducing iron oxide, other than magnetic iron oxide ($Fe_3O_4$) by hydrogen, carbon monoxide, or a mixture of carbon monoxide and hydrogen such as water gas, at an elevated temperature. The preferred reducing agent, because of its cheapness and ready availability, is water gas.

When water gas is employed as the reducing agent the reduction should be carried out at a temperature approximating the lowest temperature at which hydrogenation of the carbon monoxide would occur upon formation of the active iron. The temperature at the commencement of such hydrogenation lies between about 220° C. to 240° C. The temperature during the reduction remains steady usually at about 225° C. for four to six hours, depending upon the original moisture content of the mixture, and then it rises suddenly, but should thereafter be maintained slightly below 250° C. This temperature control is effected by regulating the inflow of the reducing gases and is maintained for about one hour, after which the temperature is allowed to fall as low as 80° C., but preferably to 150° C., at which temperature the hydrocarbons to be desulphurised may be admitted. The catalyst mixture will function at temperatures as low as 80 C. but superior efficiency is obtained if the initial desulphurising temperature is 150° C. When the sudden rise in temperature occurs it is known that the catalytically active iron referred to herein is being formed.

No temperature rise occurs, since no hydrogenation reaction can take place, if either hydrogen or carbon monoxide alone is used as the reducing agent. If hydrogen alone is employed as the reducing agent the reduction temperature may be as high as approximately 300° C., and if carbon monoxide alone is employed it may be as high as approximately 295° C. In all cases the temperature during the reducing step must be sufficiently high for the reduction to occur, that is, it must be above approximately 210° C. The reduction is continued until substantially all the iron oxide has been converted to catalytically active metallic iron.

After the greater part, or all, of the iron oxide in the alkali carbonate-iron oxide mix has been reduced to catalytically active metallic iron the temperature is preferably reduced well below that at which the agent is capable of acting as a hydrogenation catalyst, for example reduced to 80° C. to 150° C., and at this temperature it acts as a catalytic desulphurising agent. As the catalyst fouls it is necessary to raise the temperature gradually to a maximum of approximately 400° C., but preferably not above 300° C. It should be noted that if both carbon monoxide and hydrogen are present in the gases to be desulphurised the initial desulphurising temperature must be below that at which hydrogenation occurs. If the gases to be treated contain no carbon monoxide or hydrogen then a higher initial temperature may be used for desulphurising. It is undesirable to use temperatures above 300° C. if carbon monoxide is present in the gases to be treated as with such temperatures the catalyst becomes clogged with carbon.

According to a further feature of the invention the temperature employed in the process is increased during the process in accordance with the increase in the amount of sulphur absorbed by the desulphurizing agent. Both the space velocity and the rise in temperature are dependent upon the sulphur content of the hydrocarbons being treated. The space velocity is so governed since it is necessary for the sulphur compounds contained in the hydrocarbons to be in contact with the desulphurising agent for a sufficient period of time. Also an increase in temperature is necessary as the desulphurising agent absorbs more and more sulphur. Further the greater the sulphur content of the original hydrocarbons undergoing treatment the more often must the temperature be raised. It may be stated that as a general rule the rate of rise of temperature is dependent upon the rate of flow of sulphur in the hydrocarbons into contact with the desulphurising agent.

Preferably the hydrocarbons are treated in accordance with the invention until not more than 10% of its own weight of sulphur has been absorbed by the desulphurising agent.

The process may be carried out at a pressure not exceeding 10 pounds per square inch, but preferably the pressure is not more than 5 pounds per square inch. In the desulphurisation of certain hydrocarbons, of which petrol is one example, the pressure may be lower than 5 pounds per square inch in order to reduce the tendency of cracking.

Wherever the term "iron oxide" is used in this specification it is intended to include any iron oxide or any mixture of iron oxides other than magnetic iron oxide ($Fe_3O_4$). It is, however, considered that the iron oxide having the composition represented by the formula $Fe_2O_3$ is the most suitable form of oxide to use, and the preferred oxide is the naturally occurring hydrated oxide known as bog iron ore.

*Example 1*

A very efficient desulphurising agent is prepared as follows.

One part of soda ash is dry-mixed with 2 parts of bog iron ore by weight, the mixture is crushed to form a powder, and the powder mixed with water to form a stiff paste, which is dried slowly, preferably at a temperature of approximately 110° C. The paste is thus caused to set hard. This is then crushed so that the product will pass through a ¼" mesh screen. The screenings are then subjected to a reducing process whereby the greater part, or all, of the iron oxide present is converted to catalytically active metallic iron. The reduction process preferably consists in passing blue water gas through the screenings at a temperature of substantially 210° C. to 225° C. for a period of from 4 to 6 hours. After the reduction has been in progress for from 3 to 5 hours, the actual time being dependent upon the moisture content of the water gas, the temperature rises suddenly, showing that catalytically active metallic iron is being formed. The throughput of the water gas is then reduced so that the temperature is kept slightly below 250° C., and the reduction continued for 1 hour.

The agent prepared as above is ready for use as a desulphurising agent. The proportion of alkali carbonate should lie between 5% and 40% by weight.

An inert filler may be added to the desulphurising agent, preferably after the alkali carbonate and iron oxide has been intimately mixed, and before being mixed to a stiff paste. The inert filler may constitute from 0 to 80% of the final agent.

*Example 2*

Petrol having a sulphur content of approximately 1%, the sulphur being present as hydrogen sulphide, mercaptans and thiophene, is vaporised and the vapor fed at a space velocity of approximately 100 into contact with the desulphurising agent, prepared as in Example 1, at an initial temperature of 210° C. The temperature is raised by increments of 5° C. at regular intervals to 240° C. or until the desulphurising agent has absorbed about 10% of its own weight of sulphur. The rise of 5° C. in temperature should be effected at the end of each 130 hours of continuous operation. In this particular embodiment each cubic foot of desulphurising agent will remove substantially all the sulphur contained in 560 pounds weight of petrol treated.

There is reason to believe that part of the organic sulphur compounds present initially in the untreated hydrocarbons is converted during the process to inorganic sulphur compounds. The desulphurising agent, however, will remove both organic and inorganic compounds of sulphur, including hydrogen sulphide and thiophene, which may be present in the hydrocarbons at the time of contact with the agent.

*Example 3*

Towns gas having an average sulphur content as follows:

|  | Grains per 100 cubic feet |
|---|---|
| Mercaptans | 0.8 |
| Thiophene | 3.3 |
| Carbon disulphide | 10.0 |
| Carbon oxysulphide | 5.7 |
| Total | 19.8 | was passed into contact with the desulphurising agent described in Example 1 at a temperature of approximately 220° C., the temperature being maintained at this value by electric heaters, and at a velocity of 14 to 15 cubic feet per hour. A chemical analysis of the gases after treatment by the desulphurising agent showed that substantially all the sulphur compounds had been removed, the gases after treatment containing 0.50 grain of sulphur per 100 cubic feet, demonstrating that the thiophene, as well as the other sulphur compounds, had been removed by the agent.

*Example 4*

Gases produced during the digestion of wood with a solution containing sodium hydroxide and sodium sulphide at elevated temperature and pressure, having an approximate composition—

| | Per cent |
|---|---|
| Hydrogen sulphide | 16–18 |
| Methyl mercaptan | 7–9 |
| Dimethyl sulphide | 3–5 |
| Oxygen | 18–22 |
| Carbon dioxide | 6–8 |
| Nitrogen | 50–38 | were passed into contact with the desulphurising agent prepared in accordance with Example 1. Substantially all the sulphur compounds were removed from the said gases. The temperature at the beginning of the desulphurising step was approximately 200° C. and was raised as the agent absorbed the sulphur compounds to a temperature of approximately 400° C.

*Example 5*

An alternative method of preparing the desulphurising agent consists in melting 2 parts by weight of ferric nitrate and mixing with sufficient diatomaceous earth to give a stiff paste. Approximately one part of diatomaceous earth is required. The paste is then heated to about 300° C. to decompose the ferric nitrate to ferric oxide. The dried paste is then immersed in a strong solution of sodium carbonate, removed from the said solution, baked at about 300° C. and then granulated to pellets of the desired size. The pelleted agent is then treated with hydrogen, carbon monoxide, or water gas as described previously until substantially all the iron oxide has been reduced to catalytically active metallic iron.

The strength of the sodium carbonate solution is adjusted by trial until analysis of the baked sodium carbonate-iron oxide-diatomaceous earth mixture shows the required proportion of sodium carbonate, preferably from 20% to 40% of the total weight of sodium carbonate and iron oxide.

Whilst the reasons for the improved results obtained with the present invention are not entirely clear, the following sets out what the applicant at present believes to be the reactions taking place in the catalyst.

The alkali carbonate has the property, at temperatures between 80° C. and 400° C. of catalytically breaking down organic sulphur compounds to hydrogen sulphide. If no alkali carbonate were present the great proportion of organic sulphur would pass through the catalyst and appear unchanged in the effluent gas. The sodium carbonate, when pretreated by the present process, requires the presence of catalytically active metallic iron in intimate admixture therewith to fix the nascent hydrogen sulphide formed by the breaking down of organic sulphur or otherwise it would recombine to form organic sulphur compounds again. It is possible that the alkali carbonate is modified in some manner during the reducing pretreatment step. However, it appears that thiophene will not be attacked and then removed unless catalytically active metallic iron is present.

The superiority of the present process over prior processes is evidenced by the fact that there is no need to subsequently scrub, wash or otherwise treat the hydrocarbons to desulphurise same.

This application is a continuation-in-part of my copending application No. 576,905, filed February 8, 1945, and now abandoned.

I claim:

1. A process for desulphurising hydrocarbons which comprises passing the hydrocarbons in the vapor phase at temperatures between 80° C. and 400° C. into contact with a desulphurising agent comprising essentially at least one alkali carbonate and metallic iron, the said agent being prepared by intimately admixing at least one alkali carbonate, in a proportion between 5% and 40% of the mixture, with iron oxide, and activating the said desulphurising agent by reduction with a reducing agent selected from the group consisting of hydrogen, carbon monoxide, and mixtures thereof at a temperture between approximately 210° C. and 300° C. for a period of about 3 to 6 hours, whereby the iron oxide is at least in greater part reduced to a physical form suitable as a catalyst for the hydrogenation of carbon monoxide and is activated for the said desulphurising process.

2. A process for desulphurising hydrocarbons which comprises passing the hydrocarbons in the vapor phase at temperatures between 150° C. and 300° C. into contact with a desulphurising agent comprising essentially sodium carbonate and metallic iron, the said agent being prepared by intimately admixing sodium carbonate, in a proportion between 5% and 40% of the mixture, with iron oxide, and activating the said desulphurising agent by reduction with a reducing agent selected from the group consisting of hydrogen, carbon monoxide, and mixtures thereof at a temperature between approximately 210° C. and 300° C. for a period of about 3 to 6 hours, whereby the iron oxide is at least in greater part reduced to a physical form suitable as a catalyst for the hydrogenation of carbon monoxide and is activated for the said desulphurising process.

3. A process for desulphurising hydrocarbons which comprises passing the hydrocarbons in the vapor phase at temperatures between 150° C. and 300° C. into contact with a desulphurising agent comprising essentially sodium carbonate and metallic iron, the said agent being prepared by intimately admixing sodium carbonate, in a proportion between 5% and 40% of the mixture, with ferric oxide, and activating the said desulphurising agent by reduction with hydrogen at a temperature between approximately 210° C. and 300° C. for a period of about 3 to 6 hours, whereby the iron oxide is at least in greater part reduced to a physical form suitable as a catalyst for the hydrogenation of carbon monoxide and is activated for the said desulphurising process.

4. A process for desulphurising hydrocarbons which comprises passing the hydrocarbons in the vapor phase at temperatures between 150° C. and 300° C. into contact with a desulphurising agent comprising essentially sodium carbonate and metallic iron, the said agent being prepared by intimately admixing sodium carbonate, in a proportion between 5% and 40% of the mixture, with ferric oxide, and activating the said desulphurising agent by reduction with carbon monoxide at a temperature between approximately 210° C. and 295° C. for a period of about 3 to 6 hours, whereby the iron oxide is at least in greater part reduced to a physical form suitable as a catalyst for the hydrogenation of carbon monoxide and is activated for the said desulphurising process.

5. A process for desulphurising hydrocarbons which comprises passing the hydrocarbons in the vapor phase at temperatures between 150° C. and 300° C. into contact with a desulphurising agent comprising essentially sodium carbonate and metallic iron, the said agent being prepared by intimately admixing sodium carbonate, in a proportion between 5% and 40% of the mixture, with ferric oxide, and activating the said desulphurising agent by reduction with blue water gas at a temperature between approximately 210° C. and 250° C. for a period of about 3 to 6 hours, whereby the iron oxide is at least in greater part reduced to a physical form suitable as a catalyst for the hydrogenation of carbon monoxide and is activated for the said desulphurising process.

6. A process as claimed in claim 1 in which the hydrocarbons are passed into contact with the desulphurising agent at a space velocity of approximately 100 to 500 and at an initial operating temperature within the range of 140° C. to 220° C. and increasing the temperature in accordance with the increase in sulphur taken up by the said agent to a temperature not exceeding 400° C.

7. A process for desulphurising hydrocarbons which comprises passing the hydrocarbons in the vapor phase at temperatures between 80° C. and 400° C. into contact with a desulphurising agent comprising essentially at least one alkali carbonate and metallic iron, the said agent being prepared by intimately admixing at least one alkali carbonate, in a proportion between 5% and 40% of the mixture, with hydrated ferric oxide, and activating the said desulphurising agent by reduction with water gas at a temperature of 210° C. to 250° C. for approximately 3 to 5 hours until the temperature rises, and thereafter holding the temperature at below 250° C. for approximately 1 hour, whereby the iron oxide is at least in greater part reduced to a physical form suitable as a catalyst for the hydrogenation of carbon monoxide and is activated for the said desulphurising process.

PAUL XAVIER SPILLANE.

REFERENCES CITED

The following references are of record in the file of this patent:

UNITED STATES PATENTS

| Number | Name | Date |
|---|---|---|
| 1,148,570 | Bosch et al. | Aug. 3, 1915 |
| 1,904,172 | Rostin | Apr. 18, 1933 |
| 1,971,969 | Seil | Aug. 28, 1934 |
| 2,238,726 | Feisst et al. | Apr. 15, 1941 |
| 2,257,457 | Fischer et al. | Sept. 30, 1941 |
| 2,461,570 | Roberts | Feb. 15, 1949 |
| 2,467,803 | Herbst | Apr. 19, 1949 |

OTHER REFERENCES

"Chem. & Met. Engr'g," Jan. 1946, vol. 53, page 220.

"Chem. Trade Journ. and Chem. Eng.," December 10, 1937, page 519.

Pichler: "Lecture and Discussion on Fe Catalysts for the Middle-pressure Synthesis," Kaiser Wilhelm Inst. for Coal Research, Mulheim-Ruhr, September 9, 1940. Distributed by Off. of the Publication Board, Dept. of Commerce (PB 22491).